(12) United States Patent
Rogers

(10) Patent No.: US 7,369,230 B1
(45) Date of Patent: May 6, 2008

(54) APPARATUS AND METHOD FOR MEASURING PARTICULATE FLOW RATE

(76) Inventor: Donald Scott Rogers, 309 Foreman Dr., Lafayette, LA (US) 70506

(*) Notice: Subject to any disclaimer, the term of this patent is extended or adjusted under 35 U.S.C. 154(b) by 300 days.

(21) Appl. No.: 10/837,083

(22) Filed: Apr. 30, 2004

(51) Int. Cl.
*G01N 21/00* (2006.01)
*G01F 1/00* (2006.01)

(52) U.S. Cl. .......................... 356/337; 73/861
(58) Field of Classification Search .............. 356/337; 73/861–861.4; 137/98
See application file for complete search history.

(56) References Cited

U.S. PATENT DOCUMENTS

| | | | |
|---|---|---|---|
| 3,204,458 A * | 9/1965 | Adelbert | 73/861.26 |
| RE28,686 E | 1/1976 | Coulthard | |
| 4,007,755 A * | 2/1977 | Lerner et al. | 137/101.21 |
| 4,228,353 A * | 10/1980 | Johnson | 250/356.1 |
| 4,265,266 A * | 5/1981 | Kierbow et al. | 137/101.19 |
| 4,337,786 A * | 7/1982 | Myers et al. | 137/3 |
| 4,409,479 A | 10/1983 | Sprague et al. | |
| 4,491,026 A | 1/1985 | Brautigam et al. | |
| 4,519,259 A * | 5/1985 | Pitt et al. | 73/861.22 |
| 4,545,259 A * | 10/1985 | Jensen et al. | 73/861.28 |
| 4,764,253 A * | 8/1988 | Cheshire et al. | 162/198 |
| 4,799,055 A | 1/1989 | Nestler et al. | |
| 4,918,659 A * | 4/1990 | Bragg et al. | 366/132 |
| 5,009,064 A * | 4/1991 | Grob et al. | 60/276 |
| 5,030,843 A | 7/1991 | Wakamura | |
| 5,152,309 A * | 10/1992 | Twerdochlib et al. | 137/8 |
| 5,464,039 A * | 11/1995 | Bergamini | 137/551 |
| 5,517,211 A | 5/1996 | Kwang-Chien | |
| 5,547,849 A * | 8/1996 | Baer et al. | 435/7.24 |
| 5,752,545 A * | 5/1998 | Vienneau et al. | 137/486 |
| 6,303,920 B1 | 10/2001 | Wixson | |
| 6,303,924 B1 | 10/2001 | Adan et al. | |
| 6,424,407 B1 | 7/2002 | Kinrot et al. | |
| 6,452,683 B1 | 9/2002 | Kinrot et al. | |
| 6,487,916 B1 * | 12/2002 | Gomm et al. | 73/861.29 |
| 6,513,717 B2 | 2/2003 | Hannigan | |
| 6,571,641 B1 | 6/2003 | LaBorde | |
| 2006/0128895 A1 * | 6/2006 | Aisenbrey | 525/185 |

OTHER PUBLICATIONS

The Conair Group, Inc., Conair Blending Products, 2000, Pittsburgh, PA.
The Conair Group, Inc., Economical Feeding of Colorants, Additives, 2000, Pittsburgh, PA.

* cited by examiner

*Primary Examiner*—Layla G. Lauchman
*Assistant Examiner*—Jarreas Underwood
(74) *Attorney, Agent, or Firm*—Willaim W. Stagg; Chad A. Grand

(57) ABSTRACT

An apparatus for measuring the rate of flow of a volume of particulate material comprising a transparent tube of known cross-sectional area, means for supplying a flow of particulate material through the transparent tube, and an optical signal sensor for receiving an optical signal through the wall of the transparent tube from the flow of particulate material. The received optical signal is delivered to a controller for analyzing and determining the relative movement of the flow of particulate material at the wall of the tube and calculating the rate of volume flow through the tube. These observations may be used to control upstream and downstream system processes and equipment.

32 Claims, 1 Drawing Sheet

APPARATUS AND METHOD FOR MEASURING PARTICULATE FLOW RATE

FIELD OF THE INVENTION

This invention relates generally to a method for measuring the volume of a flow of particulate material, and more particularly to an apparatus and method of measuring the volume of flow of a particulate feedstock stream by means of an optical sensing device.

BACKGROUND OF THE INVENTION

It is desirable in many devices and systems to have a relatively precise measurement of a volume or weight of particulate material. In such devices and systems, scales or other weight-measuring devices are used to weigh a desired amount of particulate material. Containers or bushings of a known volume are also used to measure a desired volume of the particulate matter. Auger or screw conveyors are also employed to supply particulate material at a desired feed or volume rate.

The use of such scales or weight-measuring devices can be expensive and may slow down the system or process in which the device is incorporated. The use of bushings or similar containers in such systems may limit the ability to precisely control a desired volume of material without the need to change or use multiple containers or bushings. Changing the containers or bushings may slow down the system or process increasing the cost of operation and decreasing the output of systems incorporating such devices. When auger or screw conveyors are used the rate of the flow is often affected by the geometry of the feed material. Verification of the rate of flow can be expensive, time consuming and imprecise. Consequently, a need exists for inexpensive and relatively precise measuring equipment for the measurement of particulate matter used in systems requiring particulate additives, particulate feedstocks and the like.

SUMMARY OF THE INVENTION

Particulate media, when fed through a tube of relatively constant cross section, will progress through the tube with little disturbance to the relative position of the individual particles within the tube. This condition exists when the internal friction of the particulate flow stream is greater than the friction between the tube wall and the particulate stream. In flow terms such a condition is characterized as laminar flow, the flow having a virtual absence of a boundary layer of particulate material between the wall of the tube and the flowing particulate.

When a laminar flow of particulate material with virtual absence of a boundary layer through a tube occurs, the flow velocity of the particulate stream at the tube wall is the practical equivalent of the flow velocity of the particulate material at any point within the tube. This particulate flow yields a particulate stream having a volume flow rate directly proportional to the velocity of the particulate stream observed at the tube wall and the cross-section area of the tube. Maintenance of the laminar flow condition of a stream of particulate material through a given tube requires the proper balance of the size and shape of the particles in the particulate stream and the size and geometry of the tube.

Applicant has determined that when a tube in which the particulate material is flowing is transparent, a fixed pattern of particulate material may be observed at the wall of the tube. This fixed pattern of particulate material has been observed to translate relative to the tube at a rate proportional to the rate of flow of the particulate material within the tube. Applicant has also determined that the velocity of this fixed pattern of particulate material may be easily measured by optical methods. Such optical sensing methods are used to determine the rate of movement of the particulate material or the relative movement of the particulate material over a known time through the transparent tube. Such optical sensing methods include those methods employed in a typical optical cursor control device or "optical mouse" used in personal computers. When the measured velocity is determined, it may then be multiplied by the cross-sectional area of the tube so as to obtain a measure of the volumetric flow rate of the particulate stream flowing through the tube.

Control devices may be used to monitor and process the velocity measurements obtained from the optical methods to control the volume of material delivered to the tube from one or more material feed streams. Such control devices may also be used to manage the concentration of additives introduced into the particulate stream flowing through the tube. The signals delivered from the optical sensor as a measurement of particulate flow rate to the control devices may be analog, optical or digital signals or a combination of these types of signals.

A device for measuring the volume of a particulate stream that incorporates a transparent tube and optical sensor as described above is particularly suited for use in particulate material conveying devices, blenders and feeders. One supplier of such devices is Conair, Inc., One Conair Drive, Pittsburgh, Pa. 15202, which manufactures feeders and conveying devices that are used in conjunction with plastic molding and extrusion devices. Many of the currently used material conveying devices employ gravity feeding of the particulate material through a hopper and the control of the rate of flow of the particulate material is problematic and must be adjusted by trial and error in many cases. Additionally, changes made to the downstream process may cause a change in feedstock flow, thus requiring readjustment of additive flow rates. This may result in the imprecise feeding of the particulate material and may result in the wasting of expensive additives and feedstocks, an increase in the cost of the process, a substandard product or any combination of the above. Use of a continuous volume-measuring device as described by Applicant will reduce or eliminate the problems associated with calibrating the flow of particulate material in many particulate delivery devices.

BRIEF DESCRIPTION OF THE DRAWINGS

Applicant's invention may be more completely understood from consideration of the following description of the illustrative embodiments and drawings that are given by way of example, in which.

DESCRIPTION OF THE EMBODIMENTS

Figure 1:
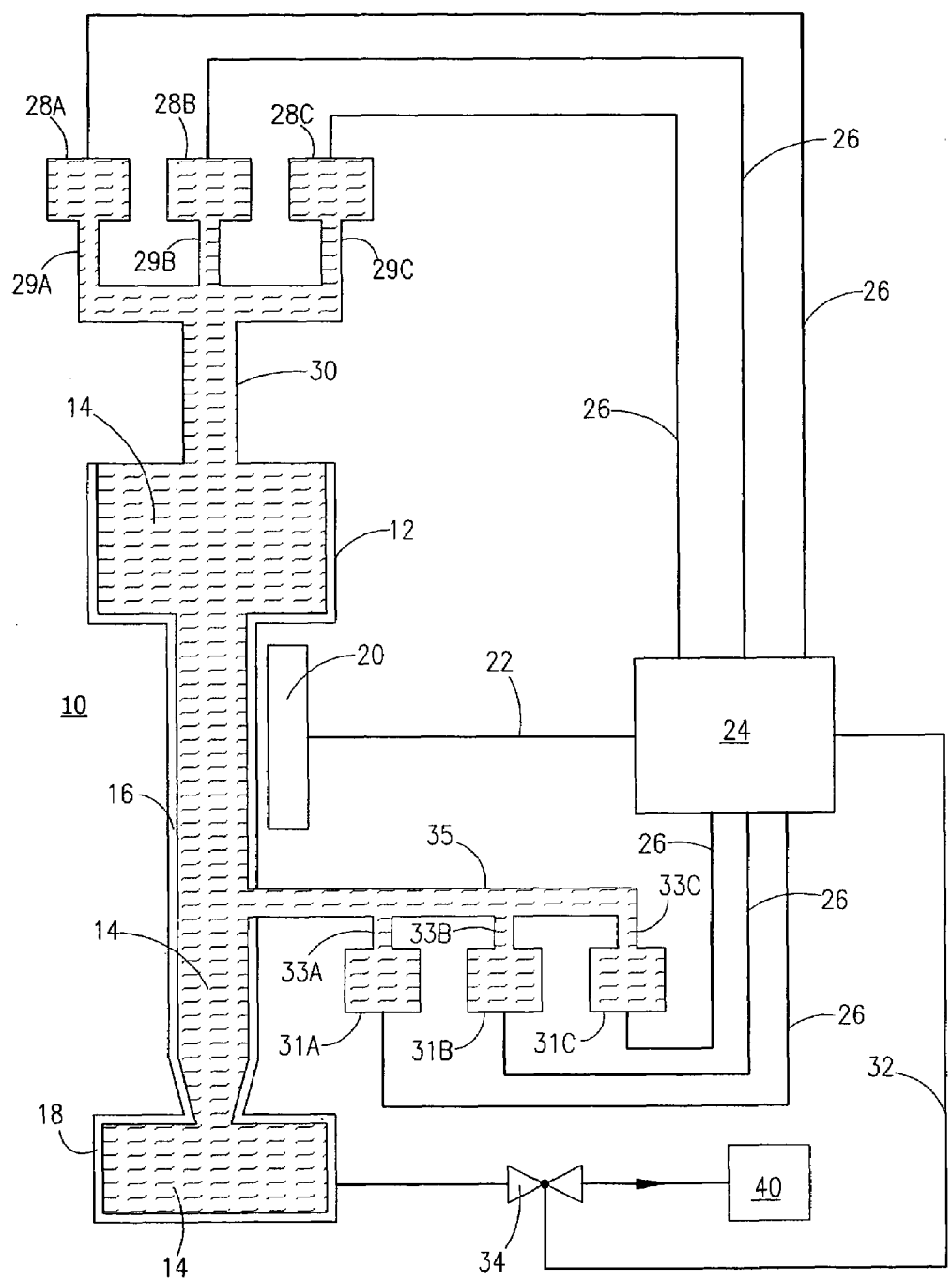
FIG. 1 is a schematic of the apparatus and method for the optical measurement of the volume flow rate of a particulate stream of Applicant's invention.

FIG. 1 shows a schematic of the apparatus for the optical measurement of the volume of a particulate stream of Applicant's invention. The apparatus (10) is comprised of a particulate hopper (12) for retaining a quantity of particulate material (14) delivered from a feedstock supply line (30).

As further shown in FIG. 1, a transparent tube (16) of a known cross-sectional area is configured to receive a quantity of particulate material (14) flowing from the hopper (12). Flow of the particulate material (14) from the hopper (12) to the transparent tube (16) may be by gravity flow or by other means.

The flow of the particulate material (14) through the tube (16) is maintained at a rate to produce substantially laminar flow conditions through the tube by means of adjusting the tube geometry to the type of particulate material involved. The intent is to produce a flow of particulate material though the tube with substantially no boundary layer at the tube wall. When such laminar flow of particulate material (14) is created through the tube (16), with a virtual absence of a boundary layer of particulate material (14) at the interior wall of the transparent tube (16) the condition exists in which there is very little to no disturbance in the relative position of the individual particles of particulate material (14) within the tube (16) at any given cross-section though the tube (16).

Positioned in proximity to the exterior of the transparent tube (16) is an optical sensing device (20). The optical sensing device (20) is similar in operation to those typically utilized in an optical curser control devices or "optical mouse" of the type used to measure the relative position of the sensor with respect to a given surface. Sensors of this type are typically used on mouse pads to determine the position of the sensor with respect to the surface of the mouse pad and thereby control the position of cursor on a PC computer screen. In the case of Applicant's invention, the optical sensor (20) of the "optical mouse" type is used to determine the position and/or speed of a stream of particulate material (14), with respect to the optical sensor (20), that is flowing adjacent to the interior wall of the transparent tube (16).

The optical sensor (20) receives light patterns or signals transmitted through the transparent tube (16) from the particulate material (14) ideally flowing in laminar fashion with no boundary layer adjacent to the interior wall of the transparent tube (16). These optical signals may be from light generated by the optical sensor (20) itself, from ambient light, or from light generated from other sources. These optical signals communicate the existing pattern of particulate material flowing in the area of measurement to the optical sensor (20). The sensor (20) subsequently determines the translation of the particulate material through successive evaluations of the optical signals.

Optical signals from the flowing particulate material (14) are received by the optical sensor (20) through the transparent tube (16) and converted or otherwise processed to digital, analog, electrical or other types of signals. These processed signals are then delivered via circuitry (22), or by wireless means, to a controller (24) having a processor for receiving, processing, storing and transmitting data or a combination thereof. These return signals are then processed by the controller (24) to calculate and determine the volume rate of flow of particulate material (14) passing through the transparent tube (16) as the particulate material (14), passing through the transparent tube (16), is delivered to a desired location (18). Such a desired location may be a particulate material collection bay where the material (14) may be further processed or transported. The material (14) may also be fed directly from the tube (16) into process equipment being utilized with the measuring apparatus. This will allow the measuring device to be adapted for use in conjunction with various types of process equipment or systems.

The controller (24) may be used to calculate the weight of particulate material (14) delivered to the material collection bay (18) by programming into the controller the weight per unit volume of the particulate material (14) being transported through the transparent tube (16). The controller (24) may further process these optical signals to control via circuitry (26), or by wireless means, the flow of particulate material or other additives from feedstock supply banks (28A, 28B, 28C), via feedstock lines (29A, 29B, 29C) to the particulate supply line (30) or from a downstream supply or additive bank or banks (31A, 31B, 31C) via a supply lines or line (35) to the flow of particulate location material (14). In this manner different types of particulate materials having desired properties may be accurately metered into the flow of particulate material (14). In the case of a feedstock supply system for injection molding equipment, these different types of particulate material may be color additives, particulate plastics of desired characteristics or the like.

The return optical signals delivered to the controller (24) from the flow of particulate material may also be processed by the controller (24) to deliver control signals via circuitry (32), or by wireless means, to a control valve (34) or other means to control delivery of particulate material (14) from the desired location (18), such as a collection receptacle, to a process point (40). Multiple optical sensors (20) and transparent flow tubes (16) may be positioned in the system as desired and used to monitor flow rates of particulate material added to the system.

In the case of a feedstock supply system for injection molding equipment the process point (40) may be an injection unit on an injection molding machine. The optical flow measuring apparatus described herein may also be used as a means for controlling systems operating downstream from the flow being measured. In general terms, the optical signals generated by the monitored rate of flow and delivered to the controller (24) may be processed and used to control the upstream flow to and through the tube (16) such as flow stream additives, the additives of flow of additives downstream from the tube (16) as well as to control upstream and downstream equipment and processes dependant upon the flow rate being monitored.

It is also thought that the optical flow measuring apparatus can be adapted and used to monitor and measure by optical means any flow stream adjacent to the tube (16) where the flow stream is flowing in substantially laminar fashion with a substantial absence of a boundary layer at the tube wall. Such flow will give substantially a uniform flow through the cross-section of the tube (16). In such a case, the flow of substantially homogeneous sludges, powders, and the like may be monitored and controlled in various types of process systems dependant upon a flow stream of input or output flow materials.

The present invention can be seen from the foregoing description to provide a method of and an apparatus for measuring by optical means the volume of particulate material passing through a tube of a known internal cross-sectional area. It is thought that the apparatus and method of the present invention and many of its attendant advantages will be understood from the foregoing description. It is also thought that it will be apparent that various changes may be made in the form, construction and arrangement of the parts of the apparatus and method without departing from the spirit and scope of the invention or sacrificing all of its material advantages.

I claim:

1. An apparatus for measuring the rate of flow of a volume of particulate material comprising:

a) at least one tube, said tube having a transparent sidewall and a known cross-sectional area;

b) means for supplying a flow of particulate material through said tube, said flow of particulate material having substantially no boundary layer at said sidewall;

c) at least one optical sensor for receiving optical signals through said sidewall of said transparent tube to determine the rate of movement of said flow of particulate material over time.

2. The apparatus as recited in claim 1, further comprising a processor for calculating the rate of flow of a volume of said particulate material through said tube from said determined rate of movement of said flow of particulate material.

3. The apparatus as recited in claim 2, wherein said processor includes means for transmitting a signal to a control means for regulating the flow of said particulate material to said tube.

4. The apparatus as recited in claim 3, wherein said particulate material is discharged from said tube to a desired location.

5. The apparatus as recited in claim 3, wherein said processor includes means for transmitting a signal to a control means for regulating desired quantities of selected additives into said flow of particulate material.

6. The apparatus as recited in claim 3, wherein said means for supplying a flow of particulate material through said transparent tube includes means for supplying desired quantities of selected additives into said flow of particulate material.

7. The apparatus as recited in claim 3, further comprising means for transmitting light through said transparent sidewall of said tube to said flow of said particulate material for generating a return optical signal to said optical sensor.

8. The apparatus as recited in claim 2, wherein said processor makes multiple evaluations of said optical signals.

9. A method for measuring the rate of flow of a volume of particulate material comprising the steps of:

a) providing a tube having a transparent sidewall, said tube having a desired geometry;

b) providing means for generating a flow of particulate material through said tube, said flow of particulate material having substantially no boundary layer at said sidewall; and c) providing an optical sensor means for receiving an optical signal from said flow of particulate material through said transparent sidewall of said tube.

10. The method as recited in claim 9, further comprising a processor means for processing said optical signal received from said flow of particulate material through said transparent sidewall of said tube and thereby calculating the rate of volume flow through said tube.

11. The method as recited in claim 10, including the additional step of discharging said particulate material from said tube to a desired location.

12. The method as recited in claim 11, including the additional step of generating a signal from said processor means for regulating the flow of said particulate material through said tube.

13. The method as recited in claim 12, including the additional step of generating a signal from said processor means for regulating the types of particulate material included in said flow of particulate material through said tube.

14. The method as recited in claim 13, including the additional step of generating a signal from said processor means for regulating output systems associated with said flow of particulate material through said tube.

15. The method as recited in claim 13, including the additional step of generating an optical signal through said transparent sidewall to said flow of particulate material.

16. The method as recited in claim 10 further comprising the step of calculating the weight of said flow of particulate material through said tube by said processor means.

17. In a plastics injection molding device having a heating chamber for receiving a quantity of plastic particulate feedstock, an apparatus for measuring the rate of flow of a volume of the plastic particulate feedstock comprising:

a) a transparent tube;

b) means for supplying a flow of particulate plastic feedstock through said transparent tube;

c) means for receiving an optical signal through the wall of said transparent tube from said flow of particulate plastic feedstock and thereby determining the relative movement of said flow of particulate plastic feedstock through said tube over a known time.

18. The apparatus as recited in claim 17, further comprising means for transmitting a signal corresponding to said relative movement of particulate plastic feedstock through said tube to a processor means whereby the rate of flow of a volume of said particulate material is calculated.

19. The apparatus as recited in claim 18, further comprising means for transmitting a signal to a control means for regulating the flow of said plastic particulate feedstock to said transparent tube.

20. The apparatus as recited in claim 19, wherein plastic particulate feedstock is discharged from said transparent tube to a desired location.

21. The apparatus as recited in claim 20, wherein said desired location is the heating chamber of said injection molding machine.

22. The apparatus as recited in claim 20, wherein said means for supplying a flow of plastic particulate feedstock through said transparent tube includes means for supplying desired quantities of additives to said flow of plastic particulate feedstock.

23. The apparatus as recited in claim 22, further comprising means for controlling the output from said plastics injection molding device.

24. The apparatus as recited in claim 23, further comprising means for transmitting an optical signal through the walls of said transparent tube to said flow of plastic particulate feedstock.

25. An apparatus for measuring the rate of flow comprising:

a) a transparent tube having a sidewall and a predetermined cross-sectional area;

b) means for supplying a flow of material through said transparent tube, said flow of material having substantially no boundary layer at said sidewall and said flow of material being substantially laminar;

c) an optical sensor for receiving optical signals through said sidewall of said transparent tube to determine the rate of movement of said flow of material over time; and d) a processor for calculating the rate of flow of a volume of said material through said tube from said determined rate of movement of said flow of material.

26. The apparatus as recited in claim 25, further comprising means for transmitting a signal from said processor to a control means for regulating the rate of flow of said material through said transparent tube.

27. The apparatus as recited in claim 26, further comprising means for transmitting a signal from said processor to a control means for regulating the insertion of desired quantities of selected additives into said flow of material through said transparent tube.

28. The apparatus as recited in claim 27, further comprising means for transmitting a signal from said processor to a control means for regulating systems downstream from said flow of material through said transparent tube.

29. The apparatus as recited in claim 28, further comprising means for transmitting an optical signal through the walls of said transparent tube to said flow of material.

30. The apparatus as recited in claim 29, further comprising means for discharging said flow of material to a desired location.

31. The apparatus as recited in claim 30, further comprising means for transmitting a signal from down stream process equipment to said processor to a control means for regulating the rate of flow of said flow of material through said transparent tube.

32. The apparatus as recited in claim 3, further comprising means for transmitting light through said transparent sidewall of said tube such that said light reflects off said particulate material and returns to said optical sensor.

* * * * *